United States Patent [19]

Cowell et al.

[11] Patent Number: 4,966,005
[45] Date of Patent: Oct. 30, 1990

[54] ADVANCED HYBRID AIR/VAPOR CYCLE ECS

[75] Inventors: Wiley M. Cowell, Fountain Valley; Quentin C. Malmberg, Hermosa Beach; Jon M. Edgar, Long Beach, all of Calif.

[73] Assignee: Allied-Signal Inc., Morris Township, Morris County, N.J.

[21] Appl. No.: 450,141

[22] Filed: Dec. 12, 1989

[51] Int. Cl.⁵ .............................................. F25B 9/00
[52] U.S. Cl. .......................................... 62/79; 62/87; 62/172
[58] Field of Search ...................... 62/175, 172, 79, 87; 98/1.5

[56] References Cited

U.S. PATENT DOCUMENTS

| | | | |
|---|---|---|---|
| 3,208,234 | 9/1965 | Messinger | 62/172 |
| 3,221,511 | 12/1965 | Garrett | 62/172 |
| 4,241,591 | 12/1965 | Edwards | 62/402 |
| 4,263,786 | 4/1981 | Eng | 62/172 |
| 4,283,924 | 8/1981 | Schütze | 62/402 |
| 4,550,573 | 11/1985 | Rannenberg | 62/87 X |

Primary Examiner—William E. Wayner
Attorney, Agent, or Firm—David B. Abel; Robert A. Walsh

[57] ABSTRACT

An advanced hybrid air and vapor cycle environmental control system (ECS) to provide conditioned, pressurized air to an aircraft as well as liquid cooling for the avionics of the aircraft.

20 Claims, 1 Drawing Sheet

ADVANCED HYBRID AIR/VAPOR CYCLE ECS

BACKGROUND OF THE INVENTION

The present invention relates to environmental control systems for aircraft and enclosed spaces having an associated power source. More particularly, the invention details an advanced environmental control system which provides conditioned, pressurized air to an aircraft as well as liquid cooling for the avionics of the aircraft.

In order to operate at high altitudes, and corresponding low ambient temperatures and pressures, aircraft require a supply of conditioned, pressurized air for the cabin. In addition, the aircraft may require cooling for the assorted electrical and avionics systems. For certain applications, the avionic cooling load may be significantly greater than the cooling required for the cockpit and cabin.

Presently, the most common type of environmental control system is a bootstrap air cycle system. Examples of these types of systems are U.S. Pat. Nos. 4,198,830 and 4,580,406. The systems of these references seek to minimize the amount of bleed air required to power the air cycle system, while accommodating the entire cooling load.

Alternatively, vapor cycle systems have been used to provide cooling for the aircraft cabin and avionics. These systems require an additional supply of high-pressure air to pressurize the cabin and replace purged air. Within these systems, the high pressure air is usually supplied by an electrically driven or shaft driven compressor. However, since the electric power or shaft power must be supplied by the aircraft's engine, the efficiency losses associated with the compression operation make the system impractical. In order to solve this inefficiency problem, certain inventors have integrated bleed air systems with vapor cycle systems to efficiently provide conditioned, pressurized air and cooling for aircraft. An example of this type of system is U.S. Pat. No. 4,263,786.

However, an integrated system which efficiently utilizes bleed air to operate an air cycle system in combination with a vapor cycle system has heretofore not been available. Thus, the prior art systems requires large, bulky air conduits, significant amounts of electric power, and oversized heat transfer units. All of which combine to make the system heavy, inefficient and voluminous.

The present invention optimizes an integrated air cycle system and vapor cycle system resulting in an advanced environmental control system. The advanced system utilizes a minimum amount of bleed air, equivalent to the amount required to pressurize the cabin and replace purged or exhausted air. Potential energy within the bleed air is used to power both the air cycle system, and potentially the vapor cycle system. The advanced environmental control system provides maximum cooling capability while utilizing a minimum amount of bleed air within a compact, lightweight system which requires a reduced amount of ram air.

BRIEF DESCRIPTION OF THE DRAWING

The FIGURE schematically depicts an advanced environmental control system according to the present invention.

DETAILED DESCRIPTION OF THE PREFERRED EMBODIMENT

Figure 1:
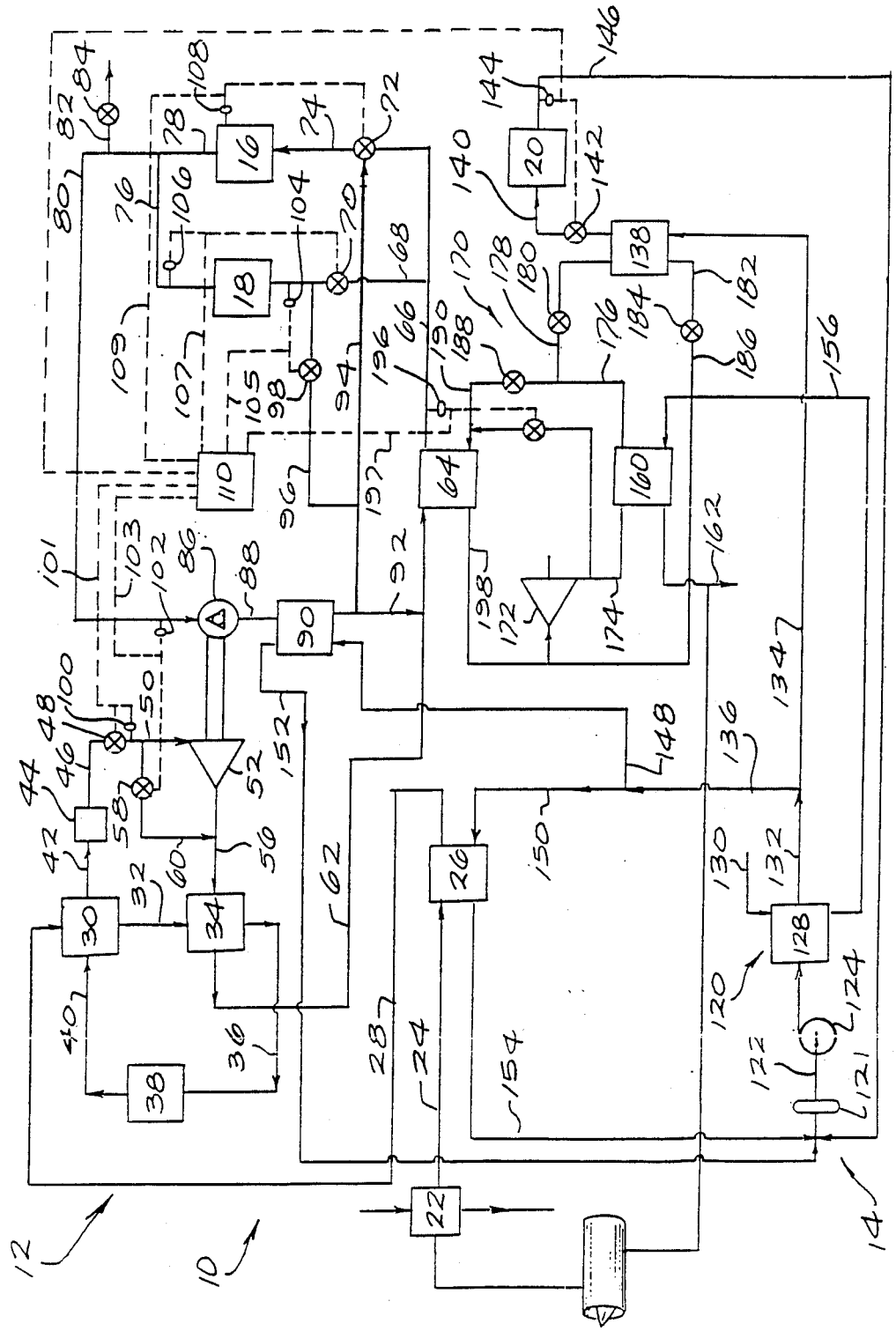

An advanced environmental control system (ECS) 10 is shown schematically in FIG. 1. The ECS 10 includes both an air cycle subsystem 12 and an integrated liquid-vapor cycle subsystem 14. The air cycle subsystem 12 provides a flow of pressurized, conditioned air to a cockpit or cabin 16, as well as to an air cooled avionics load 18. The liquid-vapor cycle subsystem 14 is a closed loop system which provides cooling to the air cycle subsystem 12 as well as liquid cooling for an additional avionics load 20. Within the ECS 10, a minimal amount of bleed is required in order to provide maximum cooling for both the cockpit and avionic loads. Heat is ultimately dumped to both ambient air through ram air passing through the primary heat exchanger 22, as well as to the fuel burned within the engine and stored aboard the aircraft.

The ECS 10 is powered by, and operates on, a flow of pressurized air bled from a high pressure source such as a compressor or gas turbine engine (not shown). The bleed air enters the air cycle subsystem 12 and is first directed through a primary heat exchanger 22 where it is cooled in heat exchange relationship with ram air. Then the bleed air passes through a duct 24 to a precooler 26 which interacts with the liquid-vapor cycle subsystem 14. The bleed air then continues within the air cycle subsystem 12, and is directed within a duct 28 to a reheater 30. The bleed air is cooled within reheater 30 and is then conducted via duct 32 to condenser 34 wherein the air is further cooled.

The bleed air exiting the condenser 34 has been cooled to a temperature below the dew point of the bleed air for the majority of operating conditions, and is conducted via duct 36 to a water extractor 38. The water extractor 38 is preferably a centrifugal type, wherein a swirl is imparted to the bleed air flow to thereby remove the condensed water vapor by centrifugal forces.

Removing the water at a high pressure, cooled location within the bleed air flow maximizes water extraction while minimizing the size and increasing the efficiency of the water extractor 38. The bleed air exiting the water extractor is at a high pressure, cooled, saturated state, and is then conducted via duct 40 to the cold pass side of reheater 30. Within reheater 30, the air is heated to a temperature up to approximately 100 degrees Fahrenheit (38° C.) and the relative humidity of the air is reduced to below about 80%.

The air is next conducted within duct 42 to a nuclear, biological, chemical (NBC) filter 44. The air pressure, temperature, and humidity downstream of the reheater 30 are ideal for the NBC filtration, thereby minimizing the size requirement of the NBC filter 44.

The decontaminated, clean bleed air exiting the NBC filter 44 is conducted via duct 46 through a flow control valve 48. The majority of the air passing through the flow control valve 48 is then conducted via duct 50 to a turbine 52. The turbine 52 is contained within an air cycle machine or turbofan 54. The air is expanded through the turbine 52, therein being reduced in both temperature and pressure. The temperature of the air exiting the turbine is in the range of between 0 to −80° F. (−18 to −62° C.) A duct 56 receives air from the turbine 52 and conducts the air to the cold pass side of the condenser 34. A fan speed control valve 58, placed within a bypass duct 60 interconnecting duct 50 and duct 56, acts to allow a portion of the air to be diverted around the turbine 52. Within condenser 34, the supercooled air from turbine 52 is heated in heat exchange relationship with the bleed air from upstream of turbine 52. The air exiting the cold pass side of condenser 34 is conducted within duct 62 to the hot pass side of air evaporator 64.

Within the evaporator 64, the air is cooled in heat exchange relationship with a refrigerant within the vapor cycle system described below. Air exiting the air evaporator 64 is preferably regulated and maintained at a constant temperature before entering a duct 66. Another duct 68 connects to the duct 66 and diverts a portion of the air flow through the air cooled avionics load 18. The air flow within duct 68 is restricted by a flow control valve 70. The remaining air within duct 66 is directed to a temperature control valve 72, which allows mixing with recirculated air, and the mixed air is then conducted via duct 74 to the cockpit or cabin 16.

Air from the avionics load 18 and from the cockpit 16 is conducted within ducts 76 and 78, respectively, to a recirculation duct 80. An overflow duct 82 connects with recirculation duct 80 and allows a certain amount of the air to be exhausted overboard through a cockpit pressure control valve 84. The remaining air within the recirculation duct 80 is conducted to a fan 86 which is preferably driven by the turbine 52. The air exiting the recirculation fan 86 is conducted within a duct 88 to a recirculation precooler 90. Within the precooler 90, the recirculated air is cooled in heat exchange relationship with coolant of the liquid cycle system described more fully below.

Air flow exiting recirculation cooler 90 is distributed within ducts 92, 94 and 96. Duct 92 connects with duct 62 upstream of the evaporated 64. Duct 94 is connected to the temperature control valve 72, and duct 96 is connected to duct 68 upstream of the avionics load 18. The air flow through duct 96 is controlled by a temperature control valve 98 such that the air entering the avionics load 18 is at a controlled, desired temperature.

The air cycle subsystem also includes an air flow sensor 100 as well as a number of temperature sensors 102, 104, 106, and 108. The air flow sensor 100 senses the air flow downstream of flow control valve 48 and controls the position of the valve 48. Temperature sensor 102 senses the air temperature upstream of fan 86 and is electrically connected and controls the fan speed control valve 58 which bypasses the air flow around the turbine 52 to vary the fan speed. Temperature sensor 104 is placed upstream of the avionics load 18 within duct 68 and controls the flow of air through duct 96 by controlling the position of valve 98 to control the temperature to avionics load 18. Temperature sensor 106 is positioned downstream of the avionics load 18 within duct 76 and is electrically connected to control the flow of air through control valve 70 within duct 68 upstream of the avionics load 18 to maintain avionics outlet temperature. The temperature sensor 108 is located within the cockpit or cabin 16 and is electrically connected to control temperature control valve 72 to control the mixing of air flows from ducts 66 with recirculation duct 94. Each of the flow control valve sensors, temperature sensors and valves are also electrically connected to an electronic control unit 110 by wires 101, 103, 105, 107, 109, respectively.

The liquid-vapor cycle subsystem 14 includes a closed loop liquid cycle system 120 and a closed loop vapor cycle system 170. The closed loop liquid cycle system 120 includes a reservoir 121 which is connected via conduit 122 to a coolant pump 124. The coolant pump 124 circulates the liquid through a conduit 126 to a liquid-to-liquid heat exchanger 128. Within heat exchanger 128, the coolant liquid is cooled in heat transfer relationship with the aircraft's fuel, supplied via fuel line 130 to the heat exchanger 128. Cooling liquid exiting heat exchanger 128 is conducted within conduit 132 and divided into two conduits 134 and 136. The liquid within conduit 134 is transported to an evaporator 138 and then through a conduit 140 to the liquid cooled avionics load 20. Flow through conduit 140 is controlled by temperature control valve 142. A temperature sensor 144 located downstream of the avionics load 20 is electrically connected via wire 145 to the control unit 110 and to the valve 142 thereby controlling the cooling of the avionics load 20. The sensor 144 is located within a return conduit 146 which returns liquid from the avionics load 20 to the reservoir 121.

The flow within conduit 136 is further divided into two separate conduits 148 and 150. The flow within conduit 148 is directed to the cold pass side of recirculation precooler 90, cooling the recirculated air within the air cycle subsystem 12. Subsequently the liquid is returned within return conduit 152 to the reservoir 121.

The flow Within conduit 150 is directed through the cold pass side of the precooler 126 of the air cycle subsystem 12 to directly cool the bleed air flow. The liquid flow exiting the precooler 26 is conducted via return conduit 154 to the reservoir 121.

The fuel which is first used within the liquid-to-liquid heat exchanger 128, to cool the liquid within the closed loop cycle system 120, is subsequently conducted via conduit 156 to a condenser 160 within the Vapor cycle subsystem 170. From the condenser 160 the fuel is conducted via fuel line 162 to the engine (not shown) or returned to the fuel tanks (not shown).

The closed vapor cycle system 170 also includes a compressor 172 which pressurizes refrigerant vapor within the system 170. The pressurized refrigerant vapor exiting the compressor 172 is conducted within duct 174 to the hot pass side of condenser 160, wherein the vapor is cooled and condenses to a liquid. The refrigerant liquid exits condenser 160 within conduit 176. A portion of the condensed refrigerant liquid is then diverted within a conduit 178 through a thermal expansion valve 180 and subsequently through the cold pass side of evaporator 138. Within the refrigerant liquid evaporator 138, the refrigerant liquid is vaporized, cooling the coolant fluid within the liquid cycle system 120 upstream of the liquid avionics load 20. The refrigerant vapor exiting the evaporator 138 is conducted within duct 182 through a temperature control valve 184 and subsequently through a return duct 186 which returns the refrigerant vapor to the compressor 172.

The remainder of the refrigerant liquid within conduit 176 passes through a thermal expansion valve 188 and into a conduit 190 which distributes the refrigerant liquid to the air evaporator 64 of the air cycle subsystem 12. The refrigerant liquid within the closed vapor cycle system 170 which is directed into the air evaporator 64 vaporizes to cool the air within the air cycle subsystem 12. Additionally, a portion of the compressed refrigerant vapor from upstream of condenser 160 is diverted through a duct 192 to the conduit 190 upstream of the air evaporator 64. The amount of refrigerant vapor flow through duct 192 is controlled by a temperature control valve 194 which is electrically connected to a sensor 196, and to the control unit 110 via wire 197. The sensor 196 is located within duct 66 of the air cycle subsystem 12 downstream of the air evaporator 64. Thus, the flow through the cold pass side of air evaporator 64, from conduit 190, may be in a liquid or a mixed vapor-liquid phase. In either case, any liquid refrigerant completely vaporizes within the air evaporator 64 and is subsequently returned within return duct 198 to the compressor 172.

The environmental control system 10 thus includes the air cycle system 12 for receiving a flow of high pressure, high temperature, engine bleed air from the engines of the aircraft, and for utilizing the pressure energy of the bleed air to efficiently condition the bleed air to a lower temperature and pressure, the air cycle system 12 receives an amount of bleed air minimally sufficient to maintain pressurization of the aircraft. ECS !0 also includes the liquid cycle system 12 having a coolant liquid circulating within a closed loop, for cooling the air within the air cycle system 12 in heat exchange relationship therewith, and for directly cooling heat generating systems aboard the aircraft. Further, the ECS 10 includes the vapor cycle system 170, having a refrigerant contained within a closed loop, for augmenting the conditioning of the air within the air cycle system 12, and for cooling the coolant liquid within the liquid cycle system 120. Finally, the ECS 10 includes the electronic controller 110 for monitoring the cooling requirements of the aircraft and for controlling the flows of air within the air cycle system 12, coolant within the liquid cycle system 120, and refrigerant within the vapor cycle system 170, to provide the required cooling and pressurization with minimum power consumption.

Within the ECS 10, the bleed air from the engine is at a high temperature and high pressure. The bleed air is cooled within the primary heat exchanger 22, precooler 26, reheater 30, and condenser 34, to a significantly lower temperature, which is generally well below the dew point of the cooled bleed air. After extraction of the water within the water extractor 38, the bleed air is reheated within reheater 30 prior to being filtered within the NBC filter 44. Incorporation of the reheater 30, and condenser 34, conserves energy within the air cycle system 12. Reheating also provides both a desired temperature for the NBC filter and prevents freezing of the water vapor when the bleed air is expanded through turbine 52.

The expanded, super cooled air from the turbine 52 is heated as it passes through condenser 34 prior to mixing with recirculated air downstream of the recirculation precooler 90. The resulting temperature of the air delivered to the evaporator 64 is in the range of between about 80 and 100° F. The air is cooled within the evaporator 64 to a temperature of about 40° F. This cooled air is then mixed with recirculated air to a desired temperature for providing cooling to both the avionics load 18 and the cockpit 16.

Recirculation air is collected from the avionics load 18 and cockpit 16 and is circulated by the turbine driven recirculation fan 86. Speed control of the recirculation fan 86, which directly controls the amount of recirculation flow, is accomplished by the temperature controller, the electronic control unit 110, and the amount of air allowed to pass through the cooling turbine 52. Hot recirculation air leaving the fan 86 is cooled within the recirculation precooler by coolant from the liquid cycle system 120. Upon leaving the recirculation precooler 90, the recirculation air mixes with the cool makeup air to enter the evaporator 64 and the air cycle repeats.

The liquid-vapor cycle subsystem 14 works to augment the air cooled loads 16 and to handle the liquid cooling load 20. Within the liquid-vapor cycle subsystem 14, the compressor 172 is preferably a high speed centrifugal type compressor. Power for the compressor 172 is preferably a permanent magnet motor. Alternatively, through the use of a coupling, shaft power, hydraulic power, or an air turbine drive may be used. It is also contemplated that the turbine 52 may be used to drive compressor 172 as well as recirculation fan 86.

Within the ECS 10, the air cycle subsystem 12 is sized and designed to minimize the amount of bleed air required, to provide only the amount necessary for pressurization and replace the air exhausted from the cockpit 16. In addition, the closed air cycle is utilized as a transport mechanism to cool the cockpit and avionic loads 16, 18. The majority of the cooling requirement for the aircraft is thus accommodated by the vapor cycle subsystem 170. The vapor cycle system 170 operates at an inherently higher efficiency than an air cycle system due to the thermodynamic properties of the refrigerant. Accordingly, the system requires a reduced amount of bleed air while accommodating peak cooling requirements with low power input.

It should be evident from the foregoing description that the present invention provides many advantages over previous environmental control systems. Although a preferred embodiment is specifically illustrated and described herein, it will be appreciated that many modifications and variations of the present invention are possible in light of the above teaching to those skilled in the art. It is preferred, therefore, that the present invention be limited not by the specific disclosure herein, but only by the appended claims.

We claim:

1. An environmental control system for an aircraft to provide a flow of conditioned air and to provide heat dissipation for systems aboard the aircraft, comprising:

air cycle system means for receiving a flow of high pressure, high temperature, engine bleed air from the engines of said aircraft, and for utilizing the pressure energy of said bleed air to efficiently condition said bleed air to a lower temperature and pressure, said air cycle system means receiving an amount of bleed air minimally sufficient to maintain pressurization of said aircraft;

liquid cycle system means, having a coolant liquid circulating within a closed loop, for cooling the air within said air cycle system means in heat exchange relationship therewith, and for directly cooling heat generating systems aboard said aircraft;

vapor cycle system means, having a refrigerant contained within a closed loop, for augmenting the conditioning of said air within said air cycle means, and for cooling the coolant liquid within said liquid cycle system means; and control means for monitoring the cooling requirements of said aircraft and for controlling the temperature and flow of air within said air cycle system means, coolant within said liquid cycle system means, and refrigerant within said vapor cycle system means, to provide the required cooling and pressurization with minimum power consumption.

2. The environmental control system of claim 1, wherein said air cycle system means further comprises:

filter means for removing entrained nuclear, biological, and chemical contaminates from said bleed air at a high pressure, low humidity location within the flow path of said bleed air.

3. The environmental control system of claim 1, wherein said air cycle system means and said liquid cycle system means further include:
precooler means for cooling said engine bleed air of said air cycle system means in heat transfer relationship with said coolant liquid of said liquid cycle system means; and
recirculation precooler means for cooling air recirculated from said aircraft within said air cycle system means in heat transfer relationship with said coolant liquid of said liquid cycle system means.

4. The environmental control system of claim 1, wherein said air cycle system means and said vapor cycle system means further include:
evaporator means, disposed within said closed loop of said vapor cycle system means, for evaporating refrigerant liquid in heat transfer relationship with conditioned air within said air cycle system means, thereby further cooling said air within said air cycle system means.

5. The environmental control system of claim 1, wherein said liquid cycle system means and said vapor cycle system means further include:
evaporator means, disposed within said closed loop of said vapor cycle system means, for evaporating refrigerant liquid in heat transfer relationship with coolant liquid within said liquid cycle system means, thereby cooling said coolant liquid within said liquid cycle system means.

6. The environmental control system of claim 1, wherein said air cycle system means further comprises:
primary heat exchanger means for directly receiving said high pressure high temperature bleed air from said engine, and for cooling said bleed air in heat exchange relationship with a flow of ambient ram air;
turbine means for expanding said high pressure bleed air to a lower pressure while simultaneously extracting useful work therefrom and cooling said bleed air;
condenser means having a hot pass section and a cold pass section, said hot pass section placed within the bleed air flow path upstream of said turbine means and said cold pass section placed within the bleed air flow path downstream of said turbine means, for regeneratively cooling the high pressure bleed air upstream of said turbine means while heating the lower pressure bleed air downstream of said turbine means in heat exchange relationship; and
precooler heat exchanger means having an air flow hot pass side positioned within the bleed air flow path between said primary heat exchanger means and said condenser means, for cooling said engine bleed air in heat transfer relationship with said coolant liquid of said liquid cycle system means.

7. The environmental control system of claim 6, wherein said air cycle system means further comprises:
water extractor means positioned within said bleed air flow path downstream of the hot pass side of said condenser means, for extracting condensed water from said high pressure bleed air; and
reheater heat exchanger means having a hot pass side located within the bleed air flow downstream of said precooler means and upstream of said hot pass side of said condenser means and a cold pass side located downstream of said water extractor means and upstream of said turbine means, for regeneratively cooling said high pressure bleed upstream of said condenser means while heating said bleed air downstream of said water extractor means preventing freezing of entrained water vapor during expansion within said turbine means.

8. The environmental control system of claim 7, wherein said air cycle system means further comprises:
filter means for removing entrained nuclear, biological, and chemical contaminates from said bleed air at a high pressure, low humidity location downstream of said hot pass side of said reheater means and upstream of said turbine means.

9. The environmental control system of claim 6, wherein said air cycle system means and said vapor cycle system means further comprises:
evaporator means, having a hot pass air flow side located downstream of said cold pass section of said condenser means within said air flow path and a cold pass section disposed within said closed loop of said vapor cycle system means, for evaporating refrigerant liquid in heat transfer relationship with air within said air cycle system means, thereby further cooling said air.

10. The environmental control system of claim 9, wherein said air cycle system means further comprises:
air distribution duct means for distributing the conditioned air from said evaporator means to the aircraft cockpit, cabin, and air cooled avionics; and
valve means responsive to said control means for regulating the temperature and flow of said conditioned air to the aircraft cockpit, cabin and air cooled avionics.

11. The environmental control system of claim 10, wherein said air cycle system means further comprises:
air recirculation duct means for recirculating at least a portion of the air from said cabin, cockpit, and air cooled avionics to locations within the flow path of conditioned air upstream of said cabin, cockpit and avionics; and
recirculation precooler means, having a hot pass side flow connected within said air recirculation duct means, for cooling said recirculated air in heat transfer relationship with said coolant liquid of said liquid cycle system means.

12. The environmental control system of claim 10, wherein said air cycle system means further comprises:
fan means within said air recirculation duct means for forcing recirculation air through said duct means and said recirculation precooler means.

13. The environmental control system of claim 12, wherein said air cycle system means further comprises:
shaft means for drivingly connecting said turbine means to said fan means;
turbine bypass duct means for diverting said high pressure air from a location within the flow path upstream of said turbine means to a location downstream of said turbine means; and
valve means within said turbine bypass duct means for varying the amount of air flow bypassing said turbine means, said valve means controlled by said control means thereby modulating the air flow through said turbine means and said fan means.

14. The environmental control system of claim 11, wherein said recirculation duct means further comprises:

temperature control bypass duct means for diverting a portion of said recirculation air from downstream of said recirculation precooler means around said evaporator means to said air distribution duct means; and temperature and flow control valve means for controlling the temperature of the air being delivered to said cockpit, cabin, and avionics, by varying the amount of recirculation air allowed to bypass said evaporator means, said control valve means electrically connected and responsive to said control means.

15. The environmental control system of claim 10, wherein said vapor cycle system means further comprises:

compressor means for pressurizing said refrigerant vapor evaporated within said evaporator means;

a return duct flow connecting said evaporator means to said compressor means;

condenser means for condensing said pressurized refrigerant from said compressor means to a liquid in heat exchange relationship with said coolant liquid within said liquid cycle system means;

first duct means flow connecting said compressor means and said condenser means;

a conduit flow connecting said condenser means and said evaporator means;

a thermal expansion valve controlling the refrigerant flow through said conduit to said evaporator means;

a bypass duct interconnecting said first duct means and said conduit to deliver pressurized refrigerant vapor to said conduit; and temperature control valve means within said bypass duct for controlling the proportional amounts of refrigerant vapor and liquid delivered to said evaporator means.

16. The environmental control system of claim 15, wherein said liquid cycle system means and said vapor cycle system means further include:

second evaporator means for evaporating refrigerant liquid in heat transfer relationship with coolant liquid within said liquid cycle system means, thereby cooling said coolant liquid within said liquid cycle system means;

a second conduit flow connecting said condenser means to said second evaporator means; and return duct means for flow connecting said second evaporator means to said compressor means to return refrigerant vapor thereto.

17. The environmental control system of claim 16, wherein said vapor cycle system means further comprises:

thermal expansion valve means for controlling the flow of refrigerant liquid from said condenser means to said second evaporator means through said second conduit.

18. The environmental control system of claim 16, wherein said liquid cycle system means further comprises:

reservoir means for containing a quantity of said coolant liquid;

a coolant pump to circulate said coolant liquid within said closed loop liquid cycle system means;

a conduit to flow connect said reservoir means to said coolant pump;

heat exchanger means for cooling said coolant liquid in heat transfer relationship with a heat sink medium;

a second conduit to flow connect said coolant pump to said heat exchanger means;

conduit distribution means for flow connecting said heat exchanger means to said precooler means, said recirculation precooler means, and said second evaporator means; and conduit return means for flow connecting said precooler means, said recirculation precooler means, and said second evaporator means to said reservoir means to return coolant liquid thereto.

19. The environmental control system of claim 18, wherein said heat sink medium is aviation fuel consumed within the aircraft power systems.

20. A method of providing environmental control within an aircraft including a flow of conditioned air and heat dissipation for systems aboard the aircraft, comprising:

bleeding a flow of pressurized air from a jet engine of said aircraft;

utilizing the pressure energy of said bleed air to efficiently condition said bleed air to a lower temperature and pressure within a bootstrap air cycle system, said air cycle system receiving an amount of bleed air minimally sufficient to maintain pressurization of said aircraft;

cooling the air within said air cycle system in heat exchange relationship with a coolant liquid within a closed loop liquid cycle system;

circulating said coolant liquid to heat generating avionic systems aboard said aircraft to directly cool said avionic systems;

providing a vapor cycle system means, having a refrigerant contained within a closed loop, to further cool the conditioned air within said air cycle system, and to cool the coolant liquid within said liquid cycle system in heat transfer relationship with said refrigerant; and monitoring the cooling requirements of said aircraft and controlling the flows of air within said air cycle system, coolant within said liquid cycle system, and refrigerant within said vapor cycle system, to provide the required cooling and pressurization with minimum power consumption.

* * * * *